United States Patent [19]

Lindén et al.

[11] Patent Number: 5,325,592
[45] Date of Patent: Jul. 5, 1994

[54] PIVOTED TOOL HAVING INTEGRAL PIVOT MEMBER AND METHOD OF PRODUCING SAME

[75] Inventors: Erkki O. Lindén, Billnäs; Karl S. Rönnholm, Karis, both of Finland

[73] Assignee: Fiskars Oy Ab, Helsinki, Finland

[21] Appl. No.: 23,811

[22] Filed: Feb. 26, 1993

Related U.S. Application Data

[63] Continuation-in-part of Ser. No. 986,057, Nov. 30, 1992.

[51] Int. Cl.⁵ .............................................. B26B 13/28
[52] U.S. Cl. ........................................ 30/254; 30/266
[58] Field of Search ................ 30/244, 250, 252, 254, 30/258, 260, 266; 76/106.5

[56] References Cited

U.S. PATENT DOCUMENTS

| | | |
|---|---|---|
| 25,508 | 9/1859 | Heinisch ............................ 30/266 |
| 94,247 | 8/1869 | Seymour . |
| 523,950 | 7/1894 | Thompson . |
| 918,672 | 4/1909 | Hansen . |
| 1,428,357 | 9/1922 | Bullard . |
| 2,626,460 | 1/1953 | Wahl . |
| 2,965,967 | 12/1960 | Wahl . |
| 3,735,763 | 5/1973 | Shannon et al. . |
| 4,007,524 | 2/1977 | Hannes et al. ......................... 30/266 |
| 4,715,122 | 12/1987 | Lindén .................................. 30/254 |
| 4,914,820 | 4/1990 | Saito ..................................... 30/254 |

*Primary Examiner*—Richard K. Seidel
*Assistant Examiner*—Hwei-Siu Payer
*Attorney, Agent, or Firm*—Foley & Lardner

[57] ABSTRACT

The present invention relates to pivoted tools such as scissors, pliers, pruners, and the like. More particularly, this invention is concerned with tools having a force applying end with formed handles, and opposed working ends disposed across a pivotable joint. In these tools, the pivotable joint, which is formed concurrently with the handles, is an integral part of one of the handles.

10 Claims, 3 Drawing Sheets

PIVOTED TOOL HAVING INTEGRAL PIVOT MEMBER AND METHOD OF PRODUCING SAME

CROSS-REFERENCE TO RELATED APPLICATION

This is a continuation-in-part application pursuant to 37 CFR 1.53(b) of co-pending U.S. patent application Ser. No. 07/986,057, filed Nov. 30, 1992, pending.

FIELD OF THE INVENTION

The present invention relates, generally, to pivoted tools such as scissors, pliers, shears, pruners and the like. More particularly, this invention is concerned with tools having a force-applying end with formed handles, and opposed working ends disposed across a pivotable joint, through which a force may be transmitted to the working surfaces of the working ends. In these tools, the pivotable joint, which is formed concurrently with the handles, is an integral part of one of the handles. Although it will become apparent from the following description that certain features of the present invention may be utilized in pivoted tools of various construction for application to specific uses, for ease of understanding and convenience, the following description will from time to time specifically refer to a pair of scissors as the most preferred implementation of the present invention.

BACKGROUND OF THE INVENTION

Pivoted implements having elongated members disposed for cooperative engagement about a pivotable joint are widely used by those desiring to transmit a force through the pivotable joint to a working piece engaged by the working surfaces of the implement. In particular, pivoted tools such as scissors generally comprise two elongated members, typically made of stamped or forged metal or other suitable material, disposed for cooperative engagement about a pivotable joint. To facilitate operation of the implement by the user, handles conforming to the fingers or hands of the user are preferably molded onto the force applying end of each elongated member, or in the case of anvil-type implements, the entire elongated member is typically made of molded material.

Conventional molding operations used to form the handles onto the force applying ends consist of positioning one elongated member in a suitable space in a die casting mold wherein the member is fixed in position with respect to the mold. A pin or the like going through the pivot point aperture in the member secures the member with respect to the mold. As described in U.S. Pat. No. 4,715,122 to one of the present inventors, the space receiving the elongated member communicates with a mold cavity for the handle portion. The cavity is subsequently filled with a fluid plastic material or the like, whereby the plastic material partially surrounds the force applying end (also called tang portion) of the elongated member so that the handle is molded onto the tang. The same operation is separately repeated to form the handle on the other elongated member. The final step in the manufacturing of scissors or other pivotable tools as described above, whether elongated members of such items have earlier been provided with molded handles, consists of bringing the apertures of the two elongated members into registration and installing the pivot member to maintain the elongated members in cooperative assembled relationship about the pivotable joint.

On the other hand, die cast articulated tools produced by the intercasting technique, such as for example those manufactured in accordance with the process disclosed in U.S. Pat. No. 4,007,524 to Hannes et al., require several casting and adjusting operations. In particular, although the intercasting method eliminates the need to later insert a separate pivot member and screw, in such tools a pivot pin which is integrally formed with a first cast elongated member serves as a mold for the subsequent casting of the other member and pivot connection. Accordingly, more than one casting operation is required. As also disclosed in Hannes, the second casting operation is preferably followed by an appropriate adjustment of the pivot to reduce binding.

From the foregoing, it can be readily recognized that prior art methods used to manufacture pivoted tools having elongated members, such as scissors or the like, have certain disadvantages. These prior art methods typically require assembling two members which have previously been separately manufactured, or sequentially casting two members of different configuration, thereby increasing material handling requirements which generally translate into higher unit cost. Thus, it appears desirable to provide pivoted tools such as scissors or the like which can alleviate the problems associated with conventional manufacturing methods, i.e., which are engineered to lend themselves to functional assembling during, as opposed to subsequent to, the manufacturing process, or which otherwise reduce the number of operations required to manufacture these pivoted tools.

SUMMARY OF THE INVENTION

The present invention facilitates the manufacturing of scissors or the like by facilitating the manufacturing process and eliminating assembling operations typically required with such pivoted implements, and by improving, or at least maintaining the functional quality of the tool. Pivoted tools such as scissors or the like according to the present invention are characterized in that a pair of elongated members are disposed in cavities of a mold to which an uncured or otherwise flowable polymer, copolymer or the like is supplied, as by injection, to form handles at the force applying end of the members. As explained above, in the case of anvil-type implements, only one elongated member (typically the blade member) is disposed in a cavity of the mold while the other member (the anvil member) will be molded in its entirety. In the case of scissors or scissors-type implements, the mold cavities forming the handles are such that the pivot member is formed integrally with one of the plastic handles. On the other hand, in anvil tools the pivot member will be formed integrally with one of the elongated members. Accordingly, tools in accordance with the present invention can be constructed without requiring post-manufacturing assembling operations.

According to one embodiment of the present invention, in a pivoted tool having a pair of elongated members provided with molded handles and pivot member, the pivot member is molded substantially concurrently with the handles, integrally with one of them.

According to another embodiment of the present invention, in a tool having a pair of elongated members pivotally connected about a pivotable joint, the elongated members being provided with molded handles, the pivotable joint comprising a fastener and a pivot member which is molded as an integral part of one of the handles, the fastener and pivot member cooperating to permit functional clearance adjustment.

According to a preferred embodiment of the present invention, in a pair of scissors having molded handles and a pivotable joint, the pivotable joint comprising a fastener and a pivot member molded as an integral part of one of the handles and formed around the stem of the fastener, the pivot member and fastener cooperating to permit functional clearance adjustment.

The invention is also concerned with a method for the manufacture of scissors or the like comprising a pair of elongated members having molded handles disposed at the force applying end thereof, and a pivotable joint, the pivotable joint comprising a pivot member integrally formed with one of the handles. As a result, manufacturing scissors in accordance with the present invention can be effectuated more efficiently and at reduced cost, simplifying the manufacturing process and eliminating secondary assembling operations, without sacrificing quality.

Other advantages of the present invention will become apparent from the detailed description given hereinafter. It should be understood, however, that the detailed description and specific embodiments are given by way of illustration only since, from this detailed description, various changes and modifications within the spirit and scope of the invention will also become apparent to those skilled in the art.

BRIEF DESCRIPTION OF THE DRAWINGS

The preferred exemplary embodiment of the present invention will hereinafter be described in conjunction with the appended drawings, wherein like numerals denote like elements and.

DETAILED DESCRIPTION OF A PREFERRED EXEMPLARY EMBODIMENT

The present invention relates to pivoted tools having elongated members disposed for cooperative engagement about a pivotable joint wherein a force, which is applied to the force applying end of the pivoted tool, is transmitted through the pivotable joint to the opposed working end of the elongated members and transferred to a working piece engaging such working ends. Accordingly, the term "scissors" as used herein from time to time should also be understood to connote other types of pivoted tools such as pliers, shears, nippers, pruners, etc., while the use of the term "plastic" handles and "plastic" pivot member further comprehends similar materials including, for example, ceramic or other suitable material which can be utilized to form the molded handles and pivot. In this vein, those skilled in the art will further appreciate that the device described herein and its principle of operation, as well as the method described herein for manufacturing such items and its principles of implementation, are broadly applicable to a wide variety of pivoted implements generally, and may be adapted to tools other than scissors. Thus, while the present invention is hereinafter described with particular reference to a pair of scissors, the skilled artisan will note its many other applications.

Figure 1:
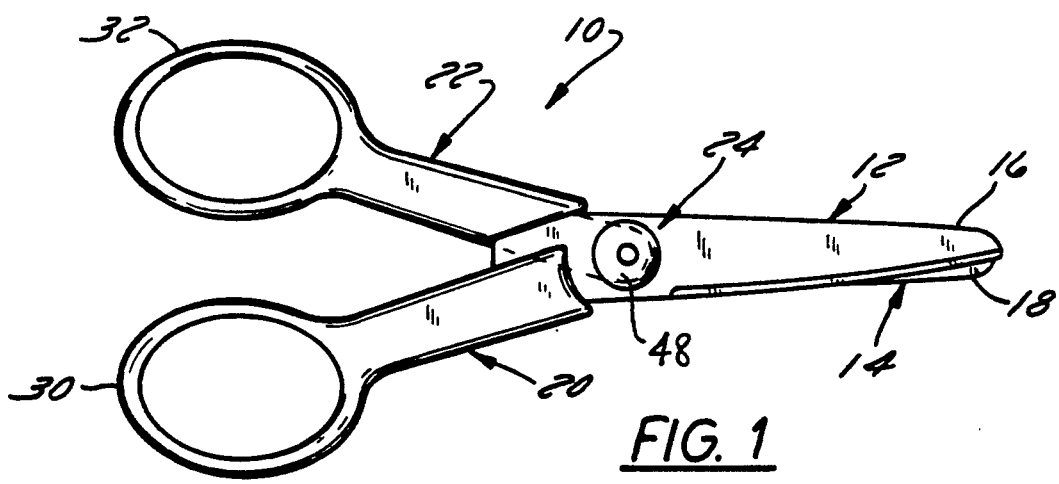
FIG. 1 is a top plan view of a pair of scissors according to the present invention.
Figure 2:
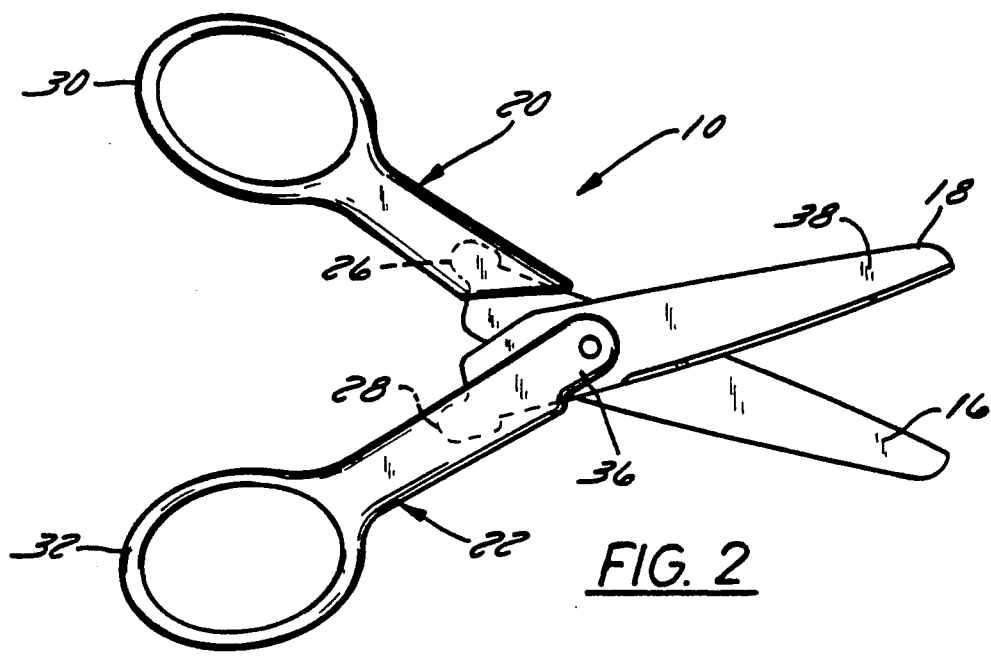
FIG. 2 is a rear plan view of scissors shown in FIG. 1.
Figure 4:
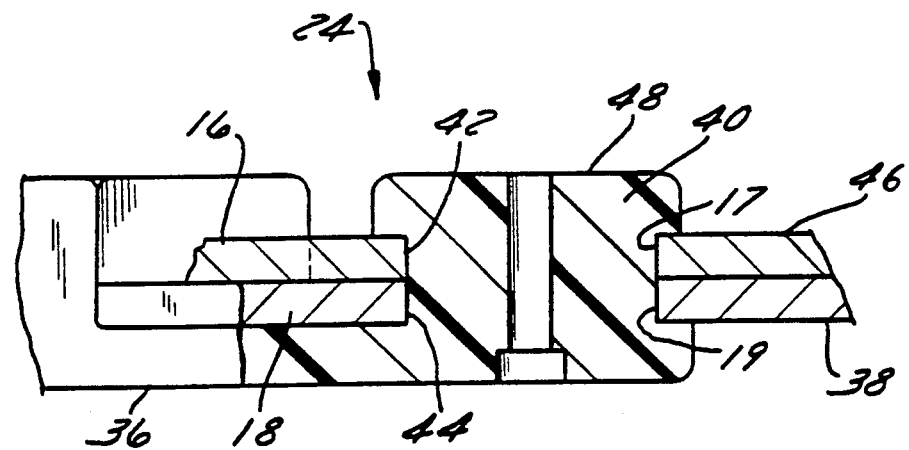
FIG. 4 is a fragmentary view of the joint of the scissors shown in FIG. 1.

Referring to FIGS. 1, 2, and 4, a pair of scissors in accordance with a first embodiment of the present invention, designated generally as 10, is shown to include first and second elongated members 12 and 14. Elongated members 12 and 14 respectively comprise a working end (a scissor blade) 16, 18 which is made of metal, a ceramic material or the like, and a force applying end 20, 22. Elongated members 12, 14, having respective apertures 17, 19, are disposed for cooperative engagement about a pivotable joint generally designated as 24 with apertures 17, 19 in substantial registration.

Referring more particularly to FIG. 4, it is readily apparent that pivotable joint 24 is integrally formed as part of handle 32 which is molded on tang 28 of force applying end 22. Handle 32 terminates at pivotable joint 24 by a tongue 36, molded integrally with handle 32, and lying adjacent and effectively in contact with the outer surface 38 of working end 18. Pivotable joint 24 comprises a shank 40, projecting from tongue 36 through registering apertures 19 and 17 into engagement with interior surfaces 42 and 44 of apertures 17, 19, respectively. Shank 40, which extends through aperture 17 beyond the outer surface 46 of working end 16, terminates by a head 48, lying adjacent and effectively in contact with outer surface 46. To maintain elongated members 12, 14 pivotally assembled, head 48 has a diameter which is larger that aperture 17.

It should be recognized that in the case of anvil-type implements, typically, elongated member 14 will be formed as one single element (i.e., combining force applying end 22 and working end 18 into one member). In that case, pivoted tool 10 would not include aperture 19 as working end 18 would not be assembled to force applying end 22 but rather would be formed integrally therewith.

Figure 3:
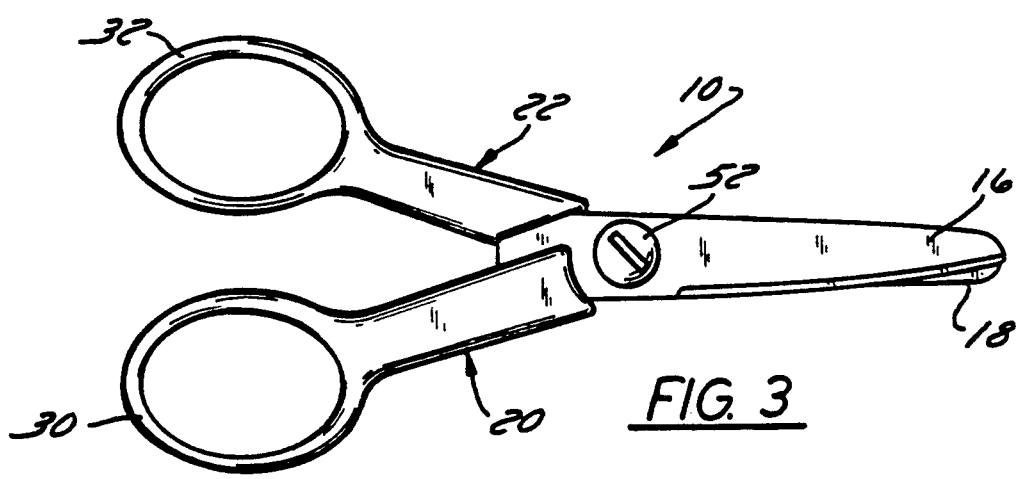
FIG. 3 is a top plan view of a second embodiment of the present invention.

As it is well known in the scissor manufacturing art, scissors typically require a certain amount of camber between the inner surfaces of the blades. Accordingly, to provide functional adjustment of the amount of friction desired between the inner surfaces of these blades, a fastener may be used to adjust the compressive force applied to the pivotable joint. In that case, and as more particularly shown in the second embodiment of the invention disclosed in FIGS. 3 and 5, shank 40, extending from tongue 36 through apertures 19 and 17, terminates at a point lying on or below the junction of aperture 17 and outer surface 46. Shank 40 is provided with a threaded bore 50 receiving a threaded fastener 52 used to control the compressive force applied to pivotable joint 24, thereby allowing adjustment of the amount of friction between engaging inner surfaces 54 and 56 of working ends 16 and 18, respectively. It should be noted that this frictional adjustment may be provided by other means known to those skilled in the art, or may be created during the manufacturing of tool 10 as will be explained below as part of the description of a method which may be used to form tool 10. It should be recognized as well that shank 40 and tongue 36 could readily be adapted to accommodate such other adjustment means without departing from the scope of the present invention.

Figure 5:
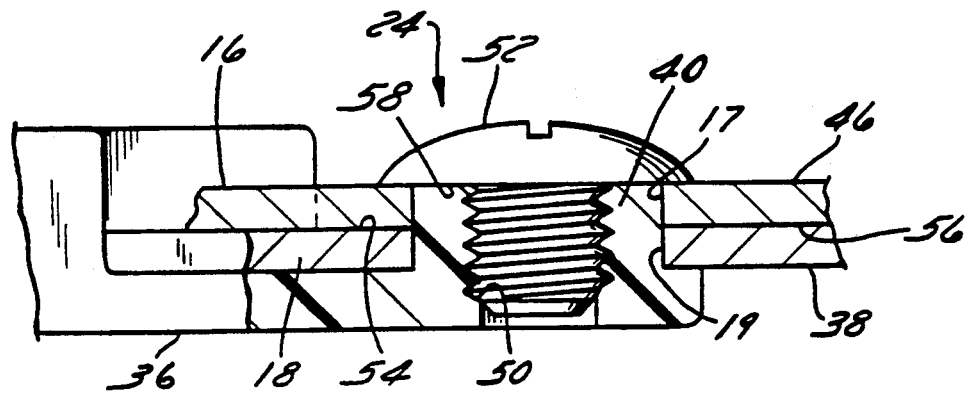
FIG. 5 is a fragmentary view of the joint of the scissors shown in FIG. 3.
Figure 6:
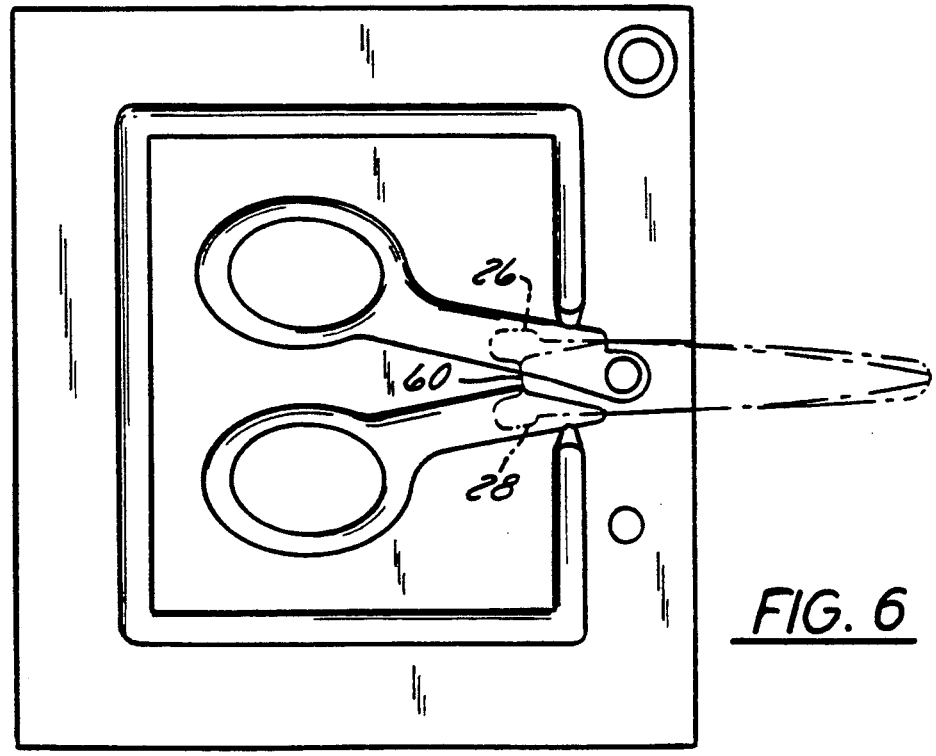
FIG. 6 is a top plan view of one-half of a mold for the manufacture of scissors shown in FIG. 1.

As disclosed in FIGS. 4-6, pivotable joint 24 is formed in situ within a mold cavity receiving elongated members 12 and 14. Accordingly, shank 40 rigorously conforms with apertures 17 and 19. Head 48 (or fastener 52, as applicable) cooperates with tongue 36 to maintain elongated members 12, 14, in cooperative assembled relationship about pivotable joint 24.

Referring now to FIG. 6, in an embodiment of the present invention, to mold plastic handles 30 and 32 and pivotable joint 24, elongated members 12 and 14 are disposed in a cavity of the mold with inner surfaces 54, 56 oppositely facing and with tangs 26, 28 abutting against a common surface 60 of the mold. To enable functional operation of pivoted tool 10, one of the apertures, such as, for example, aperture 17, must necessarily be substantially circular.

Referring to FIG. 5, in a preferred embodiment of the present invention, shank 40 preferably terminates substantially at a point lying on the juncture of aperture 17 and outer surface 46 when fastener 52 is disposed in the mold used to form shank 40, tongue 36, and handles 30 and 32. This advantageously permits surface 58 of fastener 52 lying adjacent outer surface 46 to serve as an abutment face preventing the liquid plastic injected in the mold to form handle 32 from expanding beyond the juncture of aperture 17 and outer surface 46, thereby determining the extremity of shank 40. If desirable, for functional reasons, to avoid having outer surface 46 engage surface 58 lying adjacent thereto, a washer of a different material can be interposed between such surfaces by disposing such washer in the mold cavity of pivotable joint 24.

Figure 7:
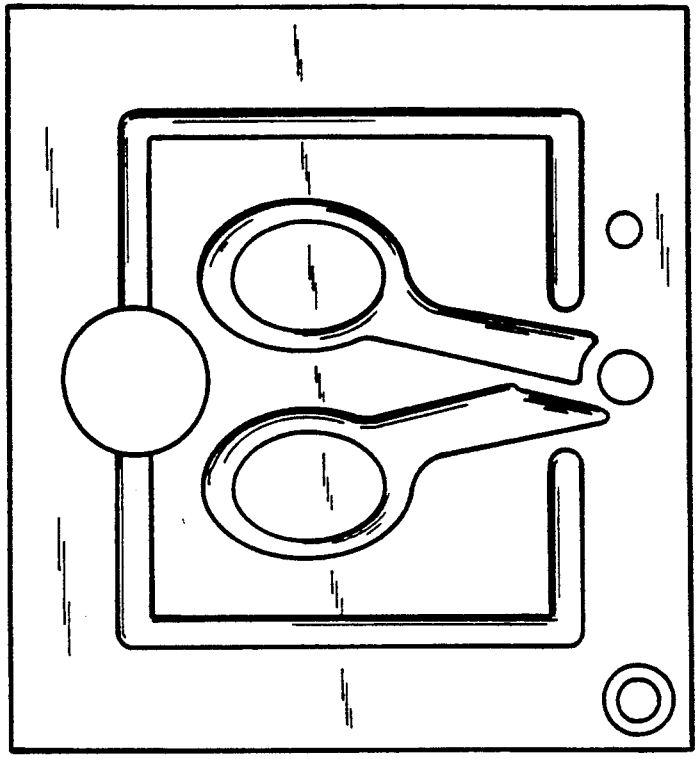
FIG. 7 is a top plan view of the other half of the mold shown in FIG. 6 with the blades of the scissors shown in the mold in shadow lines.

The invention is also directed toward a method for manufacturing tools disclosed herein. To manufacture scissors in accordance with the present invention, elongated members 12 and 14 are positioned in the mold, and liquid plastic is fed to a mold cavity communicating with apertures 17 and 19 and terminating by a space suitable to form head 48. As shown in FIGS. 6 and 7, the cavity forming head 48 communicates with the cavities configured to form handles 30, 32 which receive tangs 26, 28, respectively. A feeding conduit connects these cavities to a source of fluid material such as plastic or the like.

As previously indicated, pivoted tools require an adjustments of the amount of friction between the inner surfaces of the working ends. Such adjustment which is usually done manually typically as the last step in the manufacturing process, consists of, as applicable, striking the pivotable joint with a suitable impact tool or of adjusting the fastener of the pivoted implement. Accordingly, and because to form head 48 pressure is necessarily applied to pivotable joint 24 longitudinally and downwardly in FIG. 4 along the axis of shank 40, the manufacturing process of the various embodiments of tool 10 must also include appropriate steps, such as those identified in the following paragraph, to impart the necessary amount of functional preset clearance to such tools.

In particular, in the case of the first embodiment of the present invention as illustrated in FIGS. 1, 2 and 4, at the end of the cooling time when the liquid plastic has sufficiently cooled to retain its shape but before it has solidified, a force may be applied by suitable means to the tongue side of pivotable joint 24, upwardly in FIG. 4 along the longitudinal axis of shank 40. As the mold is also constructed to permit longitudinal displacement of the cavity used to form head 48 in response to such force, a force sufficient to longitudinally displace pivotable joint 24 will as a result establish the desired amount of preset clearance between head 48 and outer surface 46. In the case of the preferred embodiment, the desired amount of functional clearance is created by appropriately loosening fastener 52 before removing assembled tool 10 from the mold.

A pivoted tool according to the present invention can therefore be manufactured with improved facility and eliminating secondary assembling operations typically required when handles are separately molded on the elongated members of such tool. Accordingly, the manufacturing cost of tools in accordance with the present invention is noticeably reduced, and consistency of appearance and functional characteristics of such tools are also favorably affected.

It is understood that the above description is of a preferred exemplary embodiment of the present invention, and that the invention is not limited to the specific forms described. For example, tools in accordance with the present invention may advantageously be constructed so that the pivot member integrally formed with one of the handles could also comprise a feature permitting self-compensation of manufacturing variances, such as that disclosed and claimed in co-pending U.S. patent application Ser. No. 07/986,057, filed Nov. 30, 1992. The combination of such feature with the present invention would therefore eliminate manual finishing operations, facilitate manufacturing, and eliminate post-manufacturing assembling steps. In such case, apertures 17 and 19 would be suitably sized to facilitate implementation of the self-compensating feature described in that co-pending U.S. patent application.

Moreover, even though one of the embodiment shown in the Figures is the preferred embodiment, it is to be noted that this invention, which is based on pivoted tools having a pivotable joint wherein the pivot member is integrally formed as part of one of the handles, can be carried out in other manners. For example, it is conceivable that the pivotable joint can be constructed in a manner different from that disclosed herein as a result of another manufacturing operation. Such combination and other constructions, however, are considered to be within the scope of this invention. Accordingly, these and other substitutions, modifications, changes and omissions may be made in the design and arrangement of the elements and in the manufacturing steps disclosed herein without departing from the scope of the appended claims.

We claim:

1. A tool having a force applying end and an opposed working end disposed across a pivotable joint through which a force may be transmitted, wherein said tool includes first and second elongated members having first and second handles molded into engagement with a respective one of said elongated members at the force applying end thereof, each of said members having oppositely facing inner and outer surfaces, said members being disposed for cooperative engagement about said pivotable joint and further wherein said joint is comprised of:

(a) first and second registering apertures, one of each formed in a respective one of said elongated members; and (b) a pivot member integrally formed with said first handle, said pivot member having a shank projecting from said first handle through said first and second apertures into engagement with the interior surfaces thereof; said shank terminating in a head lying adjacent and effectively in contact with the outer surface of said second elongated member.

2. The tool of claim 1 wherein said head has a diameter substantially exceeding the diameter of the aperture in said second member.

3. The tool of claim 1 wherein said pivot member is joined to said handle by a tongue lying adjacent and effectively in contact with the outer surface of said first elongated member.

4. The tool of claim 1 in the form of a pair of scissors, wherein said elongated members include first and second blades at the working end thereof.

5. A tool having a force applying end and an opposed working end disposed across a pivotable joint through which a force may be transmitted, wherein said tool includes first and second elongated members having first and second handles molded into engagement with a respective one of said elongated members at the force applying end thereof, each of said members having oppositely facing inner and outer surfaces, said members being disposed for cooperative engagement about said pivotable joint and further wherein said joint is comprised of:

(a) first and second registering apertures, one of each formed in a respective one of said elongated members;

(b) a pivot member integrally formed with, and joined by a tongue to, said first handle, said pivot member having a shank projecting from said tongue through said first and second apertures into engagement with the interior surfaces thereof, said shank terminating at a point lying substantially proximate but below the junction of the aperture in said second elongated member and the outer surface of said second member, said shank further including a bore; and (c) a threaded fastener received in said bore for controlling a compressive force applied to said joint.

6. The tool of claim 1 or 5 wherein said pivot member and at least one of said handles are formed in situ within a mold receiving said elongated members.

7. The tool of claim 5 wherein said fastener is disposed in said mold prior to the formation of said pivot member.

8. The tool of claim 5 wherein said fastener is a screw.

9. The tool of claim 5 wherein said fastener has a head with a diameter exceeding the diameter of said second aperture.

10. The tool of claim 5 wherein the force applying end of each of said elongated members is formed as a tang, received within the respective one of said handles.

* * * * *